Patented July 23, 1940

2,209,092

UNITED STATES PATENT OFFICE 2,209,092

THIAZOLE COMPOUND AND PROCESS OF PREPARING THE SAME

Donald Price and Frank D. Pickel, New York, N. Y., assignors to National Oil Products Company, Harrison, N. J., a corporation of New Jersey No Drawing. Application September 7, 1939, Serial No. 293,662

20 Claims. (Cl. 260—302)

This invention relates to the production of thiazole compounds having structures similar to that of the thiazole portion of vitamin $B_1$.

Vitamin $B_1$, which is also known as the antineuritic vitamin, is contained in a large number of naturally occurring food products and is believed to be essential for promoting the growth and maintaining the health of human beings; it has also been found useful in the treatment of certain diseases, e. g., beri-beri. The structure of vitamin $B_1$ has been determined and it has been found that this vitamin may be synthesized by condensing 2-methyl 5-bromomethyl 6-aminopyrimidine hydrobromide with 4-methyl 5-$\beta$ hydroxy ethyl thiazole and treating the reaction product with alcoholic silver chloride. While a number of methods have been proposed for the preparation of thiazole compounds capable of being condensed with the above pyrimidine compound of analogs thereof to produce vitamin $B_1$, these methods have so far been somewhat disadvantageous since either the starting materials therefor have been relatively expensive and difficultly available, or some of the intermediates prepared in the practice thereof were found to be unstable.

It is the object of this invention to provide a process for the preparation of thiazole derivatives which may be reacted with pyrimidine compounds to form vitamin $B_1$ or analogs thereof.

It is a further object of this invention to provide a process for the production of thiazole derivatives of the above type in which relatively cheap starting materials are employed and in which the intermediates obtained are relatively stable and hence may be stored for as long as may be desired.

In accordance with our invention 4-methyl 5-cyanomethyl thiazole is prepared by treating 4-methyl 5-methylamido thiazole with a dehydrating agent capable of dehydrating amides to form nitriles. The amido-thiazole is preferably prepared by brominating a levulinic ester having the general formula $CH_3COCH_2CH_2COOR$, in which R is an organic radical, preferably an alkyl radical containing not more than 6 carbon atoms, condensing the brominated levulinic ester with thioformamide and converting the thiazole ester thus formed to the desired amide with ammonia. It will be seen, therefore, that the starting materials and reactants employed in accordance with the process outlined above for preparing the thiazole product of our invention are all readily available and comparatively inexpensive. Furthermore, we have found that the intermediates produced in accordance with the practice of this process are stable compounds and hence may be stored for relatively long periods of time. The 4-methyl 5-cyanomethyl thiazole produced in accordance with our invention may be condensed with 2-methyl 5-bromomethyl 6 amino pyrimidine hydrobromide and the reaction product treated with alcoholic silver chloride so as to form the nitrile analog of vitamin $B_1$, which analog may be readily converted to vitamin $B_1$ by reducing the nitrile group and treating the resulting amine with nitrous acid; this condensation and conversion is described and claimed in our copending application Serial No. 310,161 filed December 20, 1939.

One of the most striking characteristics of the thiazole product of our invention is the fact that it may be catalytically reduced with hydrogen to form 4-methyl 5-$\beta$ aminoethyl thiazole. Since it has been previously supposed by workers in this field that thiazole derivatives could not be readily reduced with hydrogen, our discovery that the cyanomethyl thiazole product of our invention may be reduced in this manner is most surprising. The 4-methyl 5-$\beta$ aminoethyl thiazole may likewise be condensed with 2-methyl 5-bromomethyl 6-amino pyrimidine hydrobromide to form the amino analog of vitamin $B_1$, which analog may be converted to the vitamin by treatment with nitrous acid; this condensation and conversion is also described and claimed in our above mentioned co-pending application.

In carrying out the preferred method for preparing the 4-methyl 5-methylamido thiazole to be used to obtain the cyanomethyl thiazole product of our invention, a levulinic ester having the general formula $CH_3COCH_2CH_2COOR$, in which R is an organic radical, preferably an alkyl radical containing not more than 6 carbon atoms, e. g., a methyl or ethyl radical, is treated with bromide. The bromination may be accomplished by dissolving the levulinic ester in an inert solvent in which the ester is soluble; e. g., petroleum ether, ethyl ether, hexane, chloroform, carbon tetrachloride or dioxane, and then gradually adding to the solution with agitation an approximately equimolecular amount of bromine, the temperature being maintained between about 0° C. and about 20° C. The addition of the bromine is preferably carried out over a period of between about 3 and 4 hours, at the end of which time the brominated levulinic ester may be recovered by evaporating the solvent.

The brominated ester thus obtained may then be condensed with thioformamide. The thioformamide is preferably prepared by reacting formamide with phosphorus pentasulfide in any suitable manner and extracting the thioformamide from the reaction product with ether. The reaction of the thioformamide with the brominated ester may be carried out by dissolving an excess of the thioformamide in a solvent such as absolute alcohol and then gradually adding the brominated levulinic ester to the solution with agitation, the temperature of the solution being maintained somewhat below room temperature. The solid reaction mass which forms is filtered, washed and if necessary recrystallized.

The product resulting from the treatment of the brominated levulinic ester with thioformamide is a thiazole derivative having the following structure:

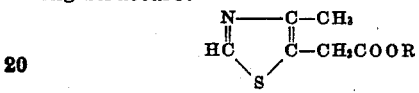

This product may then be treated with ammonia, whereby the ester is converted to an amide of the following formula:

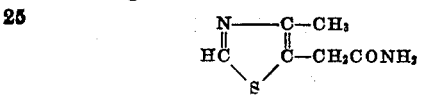

This amide is the product which is employed in accordance with our invention to yield the cyanomethyl thiazole.

The 4-methyl 5-methylamido thiazole prepared as above described may, in accordance with our invention, be treated with a dehydrating agent capable of dehydrating amides to form nitriles. We have found that the following dehydrating agents are eminently suitable for this purpose: phosphorus oxychloride, phosphorus pentoxide and phosphorus pentachloride. We prefer to employ phosphorus oxychloride on account of the excellent results obtained with this dehydrating agent. In carrying out the dehydration the 4-methyl 5-methylamido thiazole may be suspended in an excess of phosphorus oxychloride, e. g., between about 1.5 and about 4 mols of the oxychloride per mol of amide, and the temperature maintained between the boiling point of the chloride and about 120° C. for about one-half hour or more. The reaction mixture may then be cooled to a temperature between about 40° and about 50° C. and most of the phosphorus oxychloride removed from the reaction mass by evaporation. The reaction mass may then be poured over ice and the cold aqueous mass made alkaline with an alkaline agent such as sodium bicarbonate or sodium carbonate; preferably, the aqueous mass is substantially saturated with the alkaline agent in order to render the reaction product relatively insoluble in the aqueous medium. The nitrile formed may then be extracted with a solvent such as ether, benzene, chloroform and the like and purified in any suitable manner.

The product thus obtained has been found to have the structural formula:

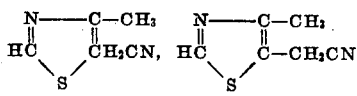

It may be condensed with 2-methyl 5-bromomethyl 6-amino pyrimidine hydrobromide to yield the cyano analog of vitamin B1 bromide hydrobromide, which analog may be converted to the cyano analog of vitamin B1 by treatment with alcoholic silver chloride.

One of the most important properties possessed by the thiazole nitrile of our invention is the ease with which it may be catalytically reduced with hydrogen to form 4-methyl 5-β-aminoethyl thiazole. Previous experimenters have indicated that thiazole compounds could not be catalytically reduced to any substantial extent with hydrogen; it was believed that the sulfur content of the thiazole compounds caused the catalysts used for the attempted reductions to become inactive. We have found that the cyanomethyl thiazole of our invention may be catalytically reduced with hydrogen by dissolving this compound in a suitable solvent therefor such as ethanol, adding thereto a small amount of a hydrogenation catalyst such as finely divided nickel or palladium, and then hydrogenating the mass in the usual manner. The hydrogenation may be carried out at room temperature or at temperatures above or below room temperature. The pressure at which the hydrogenation is accomplished may vary widely from pressures slightly above atmospheric to pressures as high as 200 atmospheres. At the completion of the hydrogenation the 4-methyl 5-β aminoethyl thiazole produced may be recovered in the usual manner by removing the catalyst, distilling off the solvent and recovering the desired product.

The following examples are illustrative of our invention. Amounts are given in parts by weight.

*Example I*

144 parts of ethyl levulinate were dissolved in 177 parts of ether and 160 parts of bromine were gradually added thereto with agitation over a period of about 2 hours, the temperature being maintained between 0° C. and 5° C. The ether solution was washed successively with water, a dilute sodium carbonate solution and again with water; the solution was then dried and the ether removed under reduced pressure. The brominated levulinate thus obtained was then gradually added with agitation to a solution of 91 parts of thioformamide in 32 parts of absolute alcohol, the temperature being maintained below 20° C. The mixture thus obtained was further agitated for a short time and then stored in an ice box overnight. At the end of this time, it was permitted to stand for 7 hours at room temperature and the solid product which crystallized from the solution was removed by filtration. This product was then shaken with 306 parts of concentrated aqueous ammonia until a clear solution was obtained. Excess ammonia and water were then removed under reduced pressure, 45 additional parts of concentrated ammonia added and the evaporation continued. The amide formed by this reaction was extracted from the reaction mass with hot dioxane, the dioxane extracts being filtered from the solid substance at elevated temperatures; the filtrate was permitted to cool, whereby a solid product crystallized therefrom. This product was separated from the dioxane and agitated with 380 parts of phosphorus oxychloride at a temperature of about 107° C. to 112° C. for one-half hour. The dark red solution formed was then cooled to a temperature of about 50° C. to 55° C. and most of the phosphorus oxychloride evaporated therefrom under reduced pressure. The residue was poured over crushed ice and the cold aqueous solution saturated with sodium carbonate. The aqueous mass thus formed was then extracted with ether and the extract heated to evaporate the ether therefrom whereby an oily product was obtained. This product, upon analysis, was found to be 4-methyl 5-cyanomethyl thiazole.

Example II 6 parts of 4-methyl 5 cyanomethyl thiazole were dissolved in 110 parts of absolute ethyl alcohol and a small amount of "Raney" nickel was added thereto. The vessel was then evacuated, flushed out with hydrogen two or three times, and shaken for 1½ hours at room temperature, the hydrogen pressure in the vessel being maintained at between 2 and 3 atmospheres. At the end of this time the catalyst was filtered off and the alcohol removed by distillation. The residue was subjected to vacuum distillation and a fraction was obtained boiling at from 82° to 85° C. at 3 mm. pressure. This product on analysis proved to be 4-methyl 5-β aminoethyl thiazole.

Example III 7 parts of 4-methyl 5 cyanomethyl thiazole were dissolved in a mixture of 148 parts of glacial acetic acid and 10 parts of concentrated hydrochloric acid. 4 parts of palladium catalyst consisting of palladium adsorbed on zirconium oxide were then added to the solution. The vessel was then evacuated and flushed out with hydrogen, after which the solution contained therein was shaken for 2½ hours under a pressure of three atmospheres of hydrogen. At the end of this time the catalyst was filtered off and the solution evaporated under a vacuum until it reached a syrupy consistency. This syrup was dissolved in methanol, cooled, the solid ammonium chloride which separated removed and ether added to the mother liquor, whereby the desired amine settled from the solution and was recovered.

It will be evident from the above description that our invention provides new and useful thiazole compounds from which vitamin B₁ and analogs thereof may be prepared. Since the starting materials employed in accordance with our invention are relatively inexpensive and easily available, and since the intermediates obtained during the practice of our invention are all stable, our invention possesses important advantages over processes heretofore proposed for the preparation of thiazole compounds capable of being reacted to produce vitamin B₁ and hence will be of great interest to those engaged in the development of vitamin products.

While our invention is primarily directed to the preparation of 4-methyl 5-cyanomethyl thiazole, since this product is capable of being reacted to produce vitamin B₁, it is to be understood that our invention is also applicable to the preparation of thiazole products having the general formula:

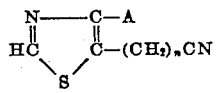

in which A stands for an alkyl radical having not more than 4 carbon atoms and $n$ is a whole number not greater than 3; for the purposes of this application it is intended to include the number "zero" within the scope of the designation "$n$" above defined. Such products may be prepared by substituting for the levulinic ester in the above process an ester having the general formula ACO(CH₂)ₙ₊₁COOR; thus, for example, 4-methyl 5-cyano thiazole may be prepared by treating an ester having the formula CH₃COCH₂COOR in accordance with the process above described.

Since certain changes in carrying out the above process and certain modifications in the products which embody the invention may be made without departing from its scope, it is intended that all matter contained in the above description shall be interpreted as illustrative and not in a limiting sense.

Having described our invention, what we claim as new and desire to secure by Letters Patent, is:

1. 4-methyl 5-cyanomethyl thiazole.
2. A compound having the general formula

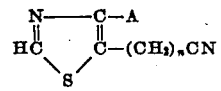

in which A denotes an alkyl radical containing not more than 4 carbon atoms and $n$ denotes a whole number not greater than 3.

3. A process for preparing 4-methyl 5-cyanomethyl thiazole which comprises treating 4-methyl 5-methylamido thiazole with a dehydrating agent capable of removing water from amides.

4. A process for preparing compounds having the general formula

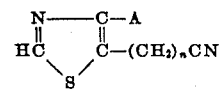

in which A denotes an alkyl radical containing not more than 4 carbon atoms and $n$ denotes a whole number not greater than 3, which comprises treating a compound having the general formula

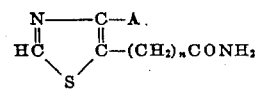

with a dehydrating agent capable of removing water from amides.

5. A process for preparing 4-methyl 5-cyanomethyl thiazole which comprises treating 4-methyl 5-methylamido thiazole with phosphorus oxychloride.

6. A process for preparing 4-methyl 5-cyanomethyl thiazole which comprises treating 4-methyl 5-methylamido thiazole with phosphorus pentoxide.

7. A process for preparing 4-methyl 5-cyanomethyl thiazole which comprises treating 4-methyl 5-methylamido thiazole with phosphorus pentachloride.

8. A process for preparing 4-methyl 5-cyanomethyl thiazole which comprises treating 4-methyl 5-methylamido thiazole with an excess of phosphorus oxychloride at a temperature between about the boiling point of the oxychloride and about 120° C.

9. A process for the preparation of 4-methyl 5-cyanomethyl thiazole which comprises brominating a levulinic ester having the general formula CH₃COCH₂CH₂COOR, in which R represents an organic radical, reacting the brominated levulinic ester with thioformamide so as to form an ester of 4-methyl 5-carboxymethyl thiazole, reacting the thiazole ester thus formed with ammonia so as to form the corresponding amide and dehydrating the amide, by treating with a dehydrating agent capable of removing water from amides.

10. A process for the preparation of compounds having the general formula

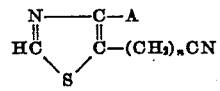

in which A denotes an alkyl radical containing not more than 4 carbon atoms and $n$ denotes a whole number not greater than 3, which comprises brominating an ester having the general formula $ACO(CH_2)_{n+1}COOR$ in which R represents an organic radical, reacting the brominated ester with thioformamide so as to form an ester having the general formula

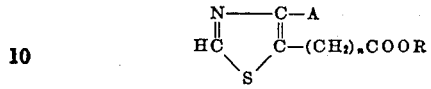

reacting the thiazole ester thus formed with ammonia so as to form the corresponding amide and dehydrating the amide, by treating with a dehydrating agent capable of removing water from amides.

11. A process for the preparation of 4-methyl 5-cyanomethyl thiazole which comprises brominating a levulinic ester having the general formula $CH_3COCH_2CH_2COOR$, in which R represents an alkyl radical containing not more than 6 carbon atoms, reacting the brominated levulinic ester with thioformamide, treating the reaction product with ammonia and dehydrating the amide thus obtained.

12. A process for the preparation of 4-methyl 5-cyanomethyl thiazole which comprises brominating a levulinic ester having the general formula $CH_3COCH_2CH_2COOR$, in which R represents an alkyl radical containing not more than 6 carbon atoms, reacting the brominated levulinic ester with thioformamide, treating the reaction product with ammonia and dehydrating the amide thus obtained by treatment with phosphorus oxychloride.

13. A process for the preparation of 4-methyl 5-cyanomethyl thiazole which comprises brominating a levulinic ester having the general formula $CH_3COCH_2CH_2COOR$, in which R represents an alkyl radical containing not more than 6 carbon atoms, reacting the brominated levulinic ester with thioformamide, treating the reaction product with ammonia and dehydrating the amide thus obtained by treatment with phosphorus pentoxide.

14. A process for the preparation of 4-methyl 5-cyanomethyl thiazole which comprises brominating a levulinic ester having the general formula $CH_3COCH_2CH_2COOR$, in which R represents an alkyl radical containing not more than 6 carbon atoms, reacting the brominated levulinic ester with thioformamide, treating the reaction product with ammonia and dehydrating the amide thus obtained by treatment with phosphorus pentachloride.

15. A process for the preparation of 4-methyl 5-β aminoethyl thiazole which comprises catalytically reducing 4-methyl 5-cyanomethyl thiazole with hydrogen.

16. A process for the preparation of 4-methyl 5-β aminoethyl thiazole which comprises reducing 4-methyl 5-cyanomethyl thiazole with hydrogen in the presence of finely divided nickel.

17. A process for the preparation of 4-methyl 5-β aminoethyl thiazole which comprises reducing 4-methyl 5-cyanomethyl thiazole with hydrogen in the presence of finely divided palladium.

18. In a process for preparing 4-methyl 5-β aminoethyl thiazole, the steps which comprise treating 4-methyl 5-methylamido thiazole with a dehydrating agent capable of dehydrating amides so as to form 4-methyl 5-cyanomethyl thiazole, and catalytically reducing the 4-methyl 5-cyanomethyl thiazole with hydrogen.

19. In a process for the preparation of 4-methyl 5-β aminoethyl thiazole, the steps which comprise treating 4-methyl 5-methylamido thiazole with a dehydrating agent capable of dehydrating amides so as to form 4-methyl 5-cyanomethyl thiazole, and reducing the 4-methyl 5-cyanomethyl thiazole with hydrogen in the presence of finely divided nickel.

20. In a process for the preparation of 4-methyl 5-β aminoethyl thiazole, the steps which comprise treating 4-methyl 5-methylamido thiazole with a dehydrating agent capable of dehydrating amides so as to form 4-methyl 5-cyanomethyl thiazole, and reducing the 4-methyl 5-cyanomethyl thiazole with hydrogen in the presence of finely divided palladium.

DONALD PRICE.
FRANK D. PICKEL.

Certificate of Correction

Patent No. 2,209,092.  July 23, 1940.

DONALD PRICE, ET AL.

It is hereby certified that errors appear in the printed specification of the above numbered patent requiring correction as follows: Page 1, second column, line 41, for the word "bromide" read *bromine;* page 2, first column, lines 66 to 69 inclusive, strike out the formula and insert instead the following— and that the said Letters Patent should be read with these corrections therein that the same may conform to the record of the case in the Patent Office.

Signed and sealed this 1st day of October, A. D. 1940.

[SEAL]

HENRY VAN ARSDALE,
*Acting Commissioner of Patents*